US008541919B2

(12) United States Patent
Lokhandwalla et al.

(10) Patent No.: US 8,541,919 B2
(45) Date of Patent: Sep. 24, 2013

(54) ROTOR STRUCTURE FOR INTERIOR PERMANENT MAGNET ELECTROMOTIVE MACHINE INCLUDING LAMINATIONS PROFILED ALONG A SEGMENT OF A BRIDGE TO DEFINE A CONCAVE AND CURVED BRIDGE PROFILE

(75) Inventors: Murtuza Lokhandwalla, Niskayuna, NY (US); Rammohan Rao Kalluri, Bangalore (IN); Kiruba Sivasubramaniam Haran, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 414 days.

(21) Appl. No.: 12/713,242

(22) Filed: Feb. 26, 2010

(65) Prior Publication Data

US 2011/0133590 A1  Jun. 9, 2011

(51) Int. Cl.
*H02K 1/27* (2006.01)
*H02K 21/14* (2006.01)
*H02K 21/12* (2006.01)

(52) U.S. Cl.
USPC ............. 310/156.53; 310/156.46; 310/156.57

(58) Field of Classification Search
USPC ............. 310/156.53, 156.56, 156.57, 156.46, 310/156, 216
IPC .................... H02K 1/27, 21/12, 21/14
See application file for complete search history.

(56) References Cited

U.S. PATENT DOCUMENTS

| 4,486,679 | A | * | 12/1984 | Jones ...................... 310/156.53 |
| RE36,367 | E | * | 11/1999 | Nagate et al. ............ 310/156.54 |
| 6,525,442 | B2 | * | 2/2003 | Koharagi et al. ........ 310/156.53 |
| 6,794,784 | B2 | * | 9/2004 | Takahashi et al. ....... 310/156.56 |
| 2005/0200223 | A1 | * | 9/2005 | Tajima et al. ............ 310/156.53 |

FOREIGN PATENT DOCUMENTS

| EP | 2012410 A1 | 1/2009 |
| EP | 2139093 A2 | 12/2009 |
| JP | 2005354798 A | 12/2005 |

OTHER PUBLICATIONS

Search Report and Written Opinion from corresponding EP Application No. 11155784.9-1251 dated Nov. 24, 2011.

* cited by examiner

*Primary Examiner* — Burton Mullins
*Assistant Examiner* — Michael Andrews
(74) *Attorney, Agent, or Firm* — Ann M. Agosti

(57) ABSTRACT

A rotor structure for an interior permanent magnet (IPM) electromotive machine is provided. The rotor structure may include at least one rotor lamination, which in turn may include at least one slot arranged to receive at least one permanent magnet. The slot divides the rotor lamination into a pole region and a yoke region. At least one bridge is arranged to connect the pole region to the yoke region at an outer edge of the lamination. The outer edge of the lamination is profiled along a segment of the bridge to define a concave curved profile for the bridge. The concave curved profile for the bridge allows to selectively size a thickness of the bridge to affect at least some electromagnetic and/or mechanical characteristic of the machine.

7 Claims, 3 Drawing Sheets

ROTOR STRUCTURE FOR INTERIOR PERMANENT MAGNET ELECTROMOTIVE MACHINE INCLUDING LAMINATIONS PROFILED ALONG A SEGMENT OF A BRIDGE TO DEFINE A CONCAVE AND CURVED BRIDGE PROFILE

FIELD OF THE INVENTION

The present invention is generally related to electromotive machines, and, more particularly, to rotor structures containing buried permanent magnets for relatively large electromotive machines.

BACKGROUND OF THE INVENTION

Presently, direct current (DC) or induction electromotive machines are generally used in diesel/electric-based locomotives, in mining vehicles and other off-highway vehicles, in certain marine vessels and aircraft, and in stationary applications (e.g., drilling applications, wind turbine drive train, etc.). The machines may be used in various operational contexts, including traction, auxiliary equipment, such as blowers or cooling equipment, and electrical power generating equipment.

Although these machines have proven through the years to be the workhorses of the industry, they sometimes suffer from various drawbacks. For example, in the case of traction motors, such motors tend to be relatively heavy, and inefficient in terms of electro-mechanical energy conversion. The capability of these machines is important not only from a fuel savings point of view but also from size, weight, cost, transient capability, cooling system, failure rate, etc. Moreover, any incremental weight of the traction motors tends to increase the transient forces on the truck (in a rail vehicle) and the road/track.

In the case of power generating equipment, DC or induction electromotive machines are typically in the form of a salient pole synchronous generator. Such generators commonly use an exciter winding in the rotor and may be energized through slip rings. The slips rings are subject to electromechanical wear and tear and may need burdensome and costly maintenance. Moreover, the volumetric spacing for vehicular applications (e.g., a locomotive) may have to be increased to accommodate the spacing requirements of electrical generating systems that use slip rings and exciter windings. In view of the foregoing considerations, it is desirable to provide an improved electromotive machine that avoids or reduces the drawbacks discussed above.

BRIEF DESCRIPTION OF THE INVENTION

In one example embodiment thereof, aspects of the present invention are directed to a rotor structure for an interior permanent magnet (IPM) electromotive machine. The rotor structure may include at least one rotor lamination, which in turn may include at least one slot arranged to receive at least one permanent magnet. The slot divides the rotor lamination into a pole region and a yoke region. At least one bridge is arranged to connect the pole region to the yoke region at an outer edge of the lamination. The outer edge of the lamination is profiled along a segment of the bridge to define a concave curved profile for the bridge. The concave curved profile for the bridge allows to selectively size a thickness of the bridge to affect at least some electromagnetic and/or mechanical characteristic of the machine.

In another aspect thereof, at least a pair of slots extends from a center post arranged to connect a pole region to a yoke region. The pair of slots may be arranged to receive at least one respective permanent magnet. The pair of slots may extend to a respective bridge arranged to connect the pole region to the yoke region at an outer edge of the lamination. The outer edge of the lamination is profiled along a segment of the respective bridge to define a concave, curved profile for the respective bridge. The concave curved profile for the bridge allows sizing a respective thickness of the bridge and/or a respective thickness of the center post to affect at least some electromagnetic and/or mechanical characteristics of the machine.

In yet another aspect thereof, an electromotive machine is made up of a stator, and a rotor operably coupled to the stator. The rotor may include a plurality of stacked rotor laminations. Each of the laminations may include at least one slot arranged to receive at least one permanent magnet. The slot divides the rotor lamination into a pole region and a yoke region. At least one bridge is arranged to connect the pole region to the yoke region at an outer edge of the lamination. The outer edge of the lamination is profiled along a segment of the bridge to define a concave curved profile for the bridge. The concave curved profile for the bridge allows to selectively size a thickness of the bridge. The concave curved profile of the bridge further allows to selectively size a thickness of a center post arranged to further connect the pole region to the yoke region. A combined sizing of the thickness of the bridge and the thickness of the center post is selected to balance at least some counter-opposing electromagnetic and/or mechanical characteristics of the machine.

DETAILED DESCRIPTION OF THE INVENTION

Figure 1:
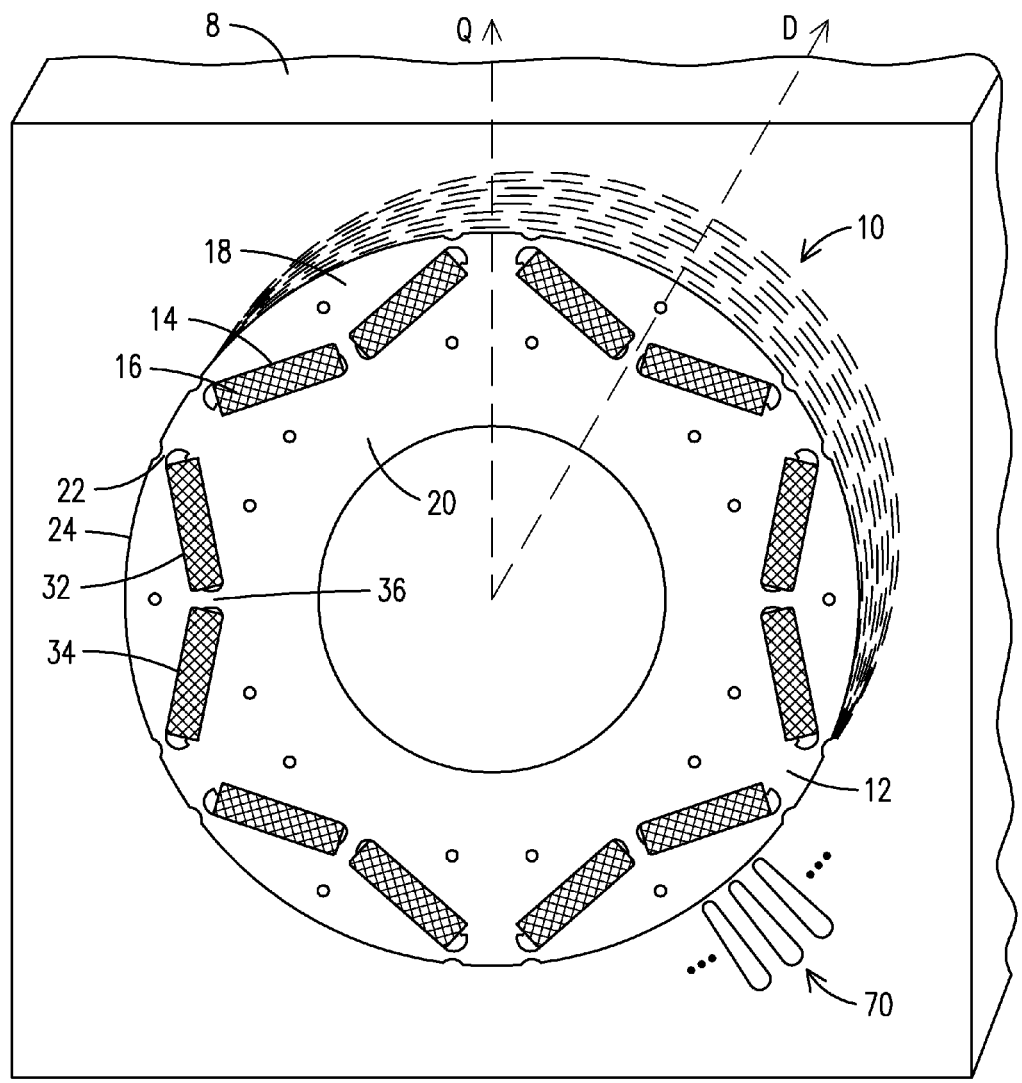
FIG. 1 is an isometric view of an example embodiment of a rotor structure embodying aspects of the present invention for a hybrid interior permanent magnet (IPM) electromotive machine.

A hybrid interior permanent magnet (IPM) electromotive machine 8 embodying aspects of the present invention uses an improved rotor structure 10 with enhanced electromagnetic and/or mechanical characteristics. As a result of such enhancements, a rotor structure embodying aspects of the present invention may be advantageously used in relatively large electromotive machines of high power rating in applications that may require operating under a limited input voltage over a broad range of speeds including operation at high speeds, such as typical of locomotives, mining vehicles and other off-highway vehicles (OHV), marine vessels, aircraft, and stationary applications (e.g., drilling applications, wind turbine drive train, etc.).

Rotor structure 10 includes at least one rotor lamination 12 where one or more slots 14 are arranged to receive at least one permanent magnet 16. The one or more slots divide the rotor lamination into a pole region 18 and a yoke region 20. (As described in more detail below, "lamination" refers to a thin metal plate or other thin plate, a plurality of which are typically stacked and adhered together to form a motor component. Thus, when it is characterized herein that the lamination includes or comprises various slots, openings, notches, etc., this means that the lamination is formed to define the slots, openings, notches, etc. through machining, cutting, stamping, or otherwise.)

FIG. 1 shows a number of slots that in combination form an example six-pole machine. It will be appreciated that aspects of the present invention are not limited to any specific number of poles. As the description proceeds below, the reader is advised that for the sake of avoiding visual cluttering, counterpart elements of different magnetic poles may be pointed to in the drawings since the functionality of such counterpart elements is the same in any given pole of the machine.

Figure 2:
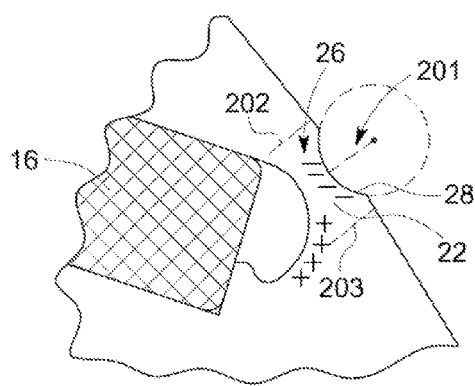
FIG. 2 is a zoomed-in view of a rotor bridge profiled in accordance with aspects of the present invention.

At least one rotor bridge 22 is arranged to connect the pole region 18 to the yoke region 20 at an outer edge 24 of the lamination. In accordance with aspects of the invention, as better appreciated in FIG. 2, the outer edge of the lamination is profiled along a segment 26 of the bridge to define a concave curved profile 28 for the bridge. That is, the bridge is contoured to have a smoothly varying concave-shaped profile along its outer edge.

As elaborated in greater detail below, a bridge profiled in accordance with aspects of the present invention ("concave-profiled bridge") may allow to selectively size a thickness of the bridge to affect at least some electromagnetic and/or mechanical characteristic of the machine. For example, the sizing of the thickness of the bridge may be chosen to provide the following example advantages: reducing a magnetic flux leakage through the bridge, reducing a peak level of mechanical stress that develops at the bridge, or providing a combined reduction of the peak level of the mechanical stresses that develops at the bridge and the magnetic flux leakage through the bridge. As will be appreciated by those skilled in the art, each of such example advantages is conducive to improve at least some of the electromagnetic and/or mechanical characteristics of the machine.

In one example embodiment, the concave curved profile 28 of the bridge defines a notch on the outer edge of the rotor lamination of the bridge (coinciding with the outer diameter (OD)). This notch may be configured to have a radius of curvature 201 within a predefined range. In one example embodiment, an example range for the radius of curvature 201 may be from a first radius of curvature value substantially equal to half the length of the bridge (shown for example as extending from dashed line 202 to dashed line 203) to a second radius of curvature value, where the second radius of curvature value is higher relative to the first radius of curvature value. In this context, substantially equal to half the length of the bridge means equal to half the length of the bridge but for manufacturing tolerances and/or deviations, as would be understood by one skilled in the art.

It will be appreciated that centrifugal forces that develop due to the magnets 16 and lamination material in the pole region 18 cause a direct tensile hoop stress as well as a bending stress at the rotor bridge. These two effects tend to produce a peak tensile stress at the inner edge of the bridge, as exemplarily represented by the plus (+) markings shown in FIG. 2. Without limiting aspects of the present invention to any particular theory of operation, the structural arrangement described above is analytically shown to reduce the relatively high peak level of stress that tends to develop at the inner edge of the bridge. The concave curved profile of the bridge is shown to re-distribute a portion of the high peak level of stress that develops at the inner edge of the bridge to the outer edge of the bridge, (exemplarily represented by the minus (−) markings shown in FIG. 2) where the peak level of stress tends to be relatively low compared to the high peak level that tends to develop at the inner edge of the bridge.

The solution recognized by the present inventors is not a trivial solution since it reflects unorthodox and insightful thinking in the sense that a concave-profiled bridge involves at least some removal of material from the bridge, and such a removal of material would tend to be viewed as being generally counterintuitive to traditional approaches for strengthening an area subject to relatively high levels of peak stresses, such as the rotor bridge.

In one example embodiment, the one or more slots may be made up of at least a pair of slots, such as slot pair 32 and 34 that extend from a respective center post 36. As shown in FIG. 1, each pair of slots that extends from a respective center post may be slantingly positioned relative to a direct axis (D). That is, in one example embodiment each pair of slots exhibits a V-shaped arrangement. It will be appreciated that aspects of the present invention are not limited to the slot pair being slantingly positioned relative to the direct axis since the slots could be perpendicularly positioned relative to the direct axis. It will be further appreciated that aspects of the present invention are not limited to a V-shaped arrangement for the slots since any rotor structure that has a rotor bridge, regardless of the specific shape of the slots can similarly benefit from advantages resulting from aspects of the present invention. Example slot arrangements may be U-shaped, M-shaped, W-shaped, etc., and may even be made up of multiple layers of slots nested within each other, as opposed to a single layer, as described above.

As will be appreciated by those skilled in the art, selection of the slot position for the magnets and magnet volume may be based on a number of considerations not necessarily limited to the following considerations: a) no load voltage under transient condition; b) fault current levels; c) field weakening speed range desired in case of motor application; d) efficiency desired for motoring and generating operations; and e) a flat output voltage-current characteristics up to desired power out level for a given operating speed in case of generator mode.

Figure 3:
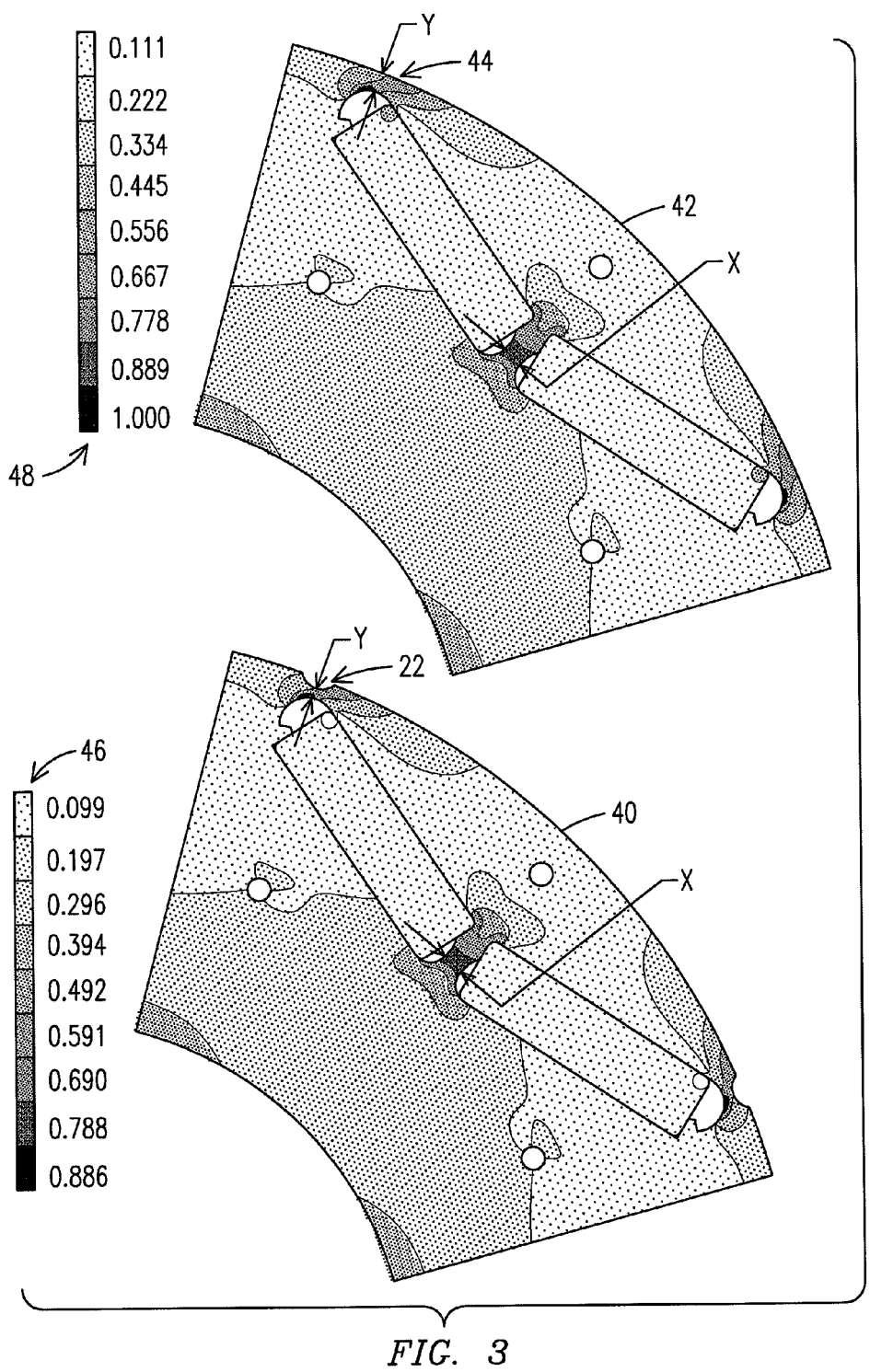
FIG. 3 illustrates example normalized levels of peak stress distribution in one example embodiment of a rotor configured to have a rotor bridge embodying aspects of the present invention versus normalized levels of peak stress distribution of a rotor having a conventional rotor bridge.

As illustrated in FIG. 3, in one example embodiment of a rotor lamination 40 having a rotor bridge 22 profiled in accordance with aspects of the present invention, the value of the bridge thickness (e.g., a minimum bridge thickness represented by the letter "Y") was kept substantially the same as the bridge thickness of a rotor lamination 42 having a conventional (i.e., unprofiled) bridge 44. In this context, substantially the same thickness value means the same thickness value but for manufacturing tolerances and/or deviations, as would be understood by one skilled in the art. As further illustrated in FIG. 3, bar 46 is indicative of normalized peak levels of Von-Mises stress distribution over rotor lamination 40, and bar 48 is indicative of normalized peak levels of Von-Mises stress distribution over rotor lamination 42. In this example embodiment, though the bridge thickness values Y are substantially the same for rotor laminations 40 and 42, a maximum reduction of the peak level of stress is obtained in rotor lamination 40, thereby improving mechanical integrity of the rotor. In this example embodiment, an example peak level reduction of approximately 11% was obtained at a nominal application rotational speed. As these stresses are due to centrifugal forces which are proportional to the square of the speed, the reduction in peak stress levels are also proportional to the square of speed and hence this construction is substantially beneficial at relatively higher speeds. It will be appreciated that if the bridge thickness Y is reduced for rotor lamination 40, (at least up to an acceptable peak stress limit) then magnetic leakage can be advantageously reduced, thereby improving electromagnetic performance (e.g., power density) of the machine.

In accordance with additional advantageous aspects of the present invention, it was unexpectedly found that a rotor bridge profiled in accordance with aspects of the present invention provided beneficial effects that extend beyond the rotor bridge. For example, a rotor bridge profiled in accordance with aspects of the present invention was found to reduce a peak level of radial stress at the center post by approximately 10% relative to an unprofiled bridge. That is, a concave-profiled rotor bridge may further allow to selectively size a thickness of the center post to affect some of the electromagnetic and/or mechanical characteristic of the machine. For example, the sizing of the thickness of the center post may be chosen to provide the following example advantages: reducing a magnetic flux leakage through the center post, reducing a peak level of mechanical stresses that develops at the center post, or providing a combined reduction of the peak level of the mechanical stress that develops at the center post, and the magnetic flux leakage through the center post. The reduction of stress at the center post is believed due to an increased stiffness of the bridges which likely causes them to collectively share a larger fraction of the centrifugal load.

Figure 4:
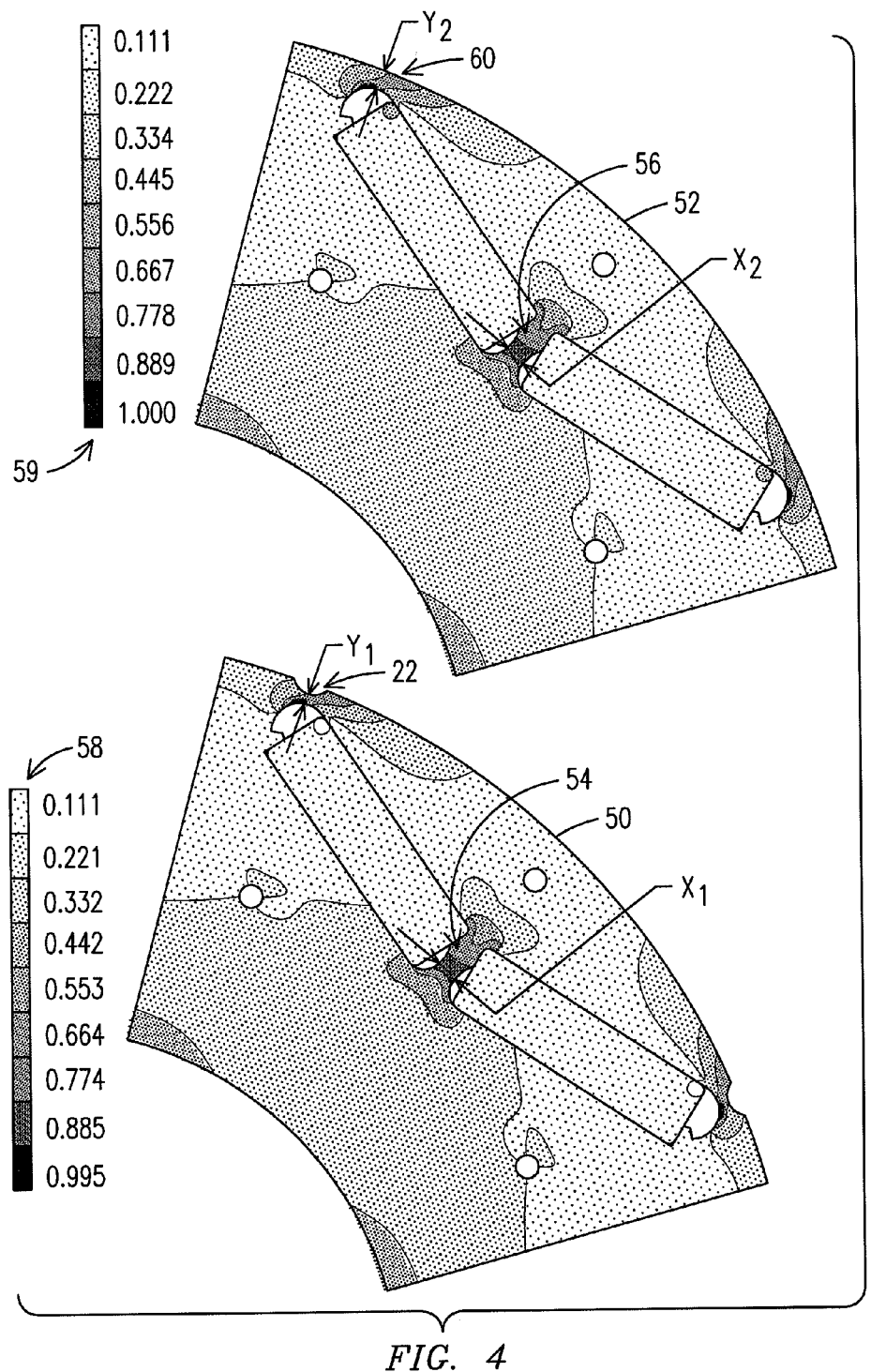
FIG. 4 illustrates example normalized levels of peak stress distribution in another example embodiment of rotor having a rotor bridge embodying aspects of the present invention versus normalized levels of peak stress distribution of a rotor having a conventional rotor bridge.

As illustrated in FIG. 4, in another example embodiment of a rotor lamination 50 having a rotor bridge 22 profiled in accordance with aspects of the present invention, the value of the bridge thickness $Y_1$ was reduced relative to the bridge thickness of a rotor lamination 52 having a conventional bridge 60 with a thickness $Y_2$. That is, $Y_1 < Y_2$. Additionally—since as noted above, a rotor bridge profiled in accordance with aspects of the present invention was found to reduce peak levels stress that tend to develop by the center post of the lamination—in this example embodiment, the value of the center post thickness (represented by the letter $X_1$) of center post 54 in rotor lamination 50 was reduced relative to the center post thickness ($X_2$) of center post 56 in lamination 52. That is, $X_1 < X_2$.

In this example embodiment, the sum of the values of the bridge thickness and the center post thickness ($X_1+Y_1$) of rotor lamination 50 was reduced by approximately 16% relative to the sum of the bridge and post thicknesses ($X_2+Y_2$) of rotor lamination 52. As further illustrated in FIG. 4, bar 58 is indicative of normalized peak levels of Von-Mises stress distribution over rotor lamination 50 and bar 59 is indicative of normalized peak levels of Von-Mises stress distribution over rotor lamination 52. In this example embodiment, the combined thickness reduction of the bridge and post structures was selected to approximately meet a common level of peak stresses. That is, a resulting peak level of stress for rotor lamination 50 was selected to be approximately the same as the peak level of stress for lamination 52, as can be appreciated from bars 58 and 59.

In this example embodiment, in view of the respective thickness reduction for the structures of the rotor bridge and the center post of rotor lamination 50 relative to the same structures of rotor lamination 52, one can achieve an example magnetic flux leakage reduction of approximately 16% in rotor lamination 50 relative to rotor lamination 52.

Thus it will be appreciated that a rotor structure embodying a rotor bridge profiled in accordance with aspects of the present invention is useful for providing design flexibility regarding the respective sizing of the above-described center post structures, and/or bridge structures to facilitate balancing counter-opposing electromagnetic and mechanical characteristics of the machine. For example, from a magnetic point of view, one would like a sufficiently narrow interconnecting structure to reduce flux losses. However, from a mechanical point of view, one would like sufficiently wide interconnecting structures to withstand an expected level of mechanical stress.

Example of improved electromagnetic and/or mechanical characteristics of the machine resulting from a rotor lamination having a concave-profiled rotor bridge may include improving a top speed RPM capability of the machine by approximately 5-6% (e.g., from 4250 to 4500 RPM) if the minimum bridge thickness is not reduced. Alternatively, the developed torque capability may be improved by approximately 5% by narrowing the bridge, but still maintaining the peak stresses and hence the top speed. Optionally, the machine size could be reduced without reducing performance, for e.g., the diameter of the rotor structure may be reduced by approximately 2.5% (or the length may be reduced by approximately by 5%) with a weight reduction of about 5%.

In operation, when used as a traction motor, an IPM machine embodying aspects of the present invention may provide various example advantages. For example, such a machine may provide a higher amount of torque per a given amount of volume, may improve thermal and transient performance, may be cost effectively used for retrofit applications, such as by replacing a so-called squirrel cage rotor without modifying any other system components in a pre-existing locomotive. For example, a rotor embodying aspects of the present invention may be retrofitable into an existing AC traction motor stator.

In operation, when used as a generator, an IPM machine embodying aspects of the present invention may provide various example advantages. For example, may be retrofittable into an existing generator stator or modified stator slots and winding pattern (e.g., concentric, tooth or customized winding pattern) with a hybrid IPM rotor configured to meet required voltage, current, power output and performance.

Another example embodiment relates to an electromotive machine that comprises a stator 70 (as fragmentarily shown in FIG. 1) and a rotor operably coupled to the stator, e.g., for rotation of the rotor relative to the stator. The rotor comprises a plurality of stacked rotor laminations, each of which is configured according to one of the embodiments described above.

While various embodiments of the present invention have been shown and described herein, it will be understood that such embodiments are provided by way of example only. Numerous variations, changes and substitutions may be made without departing from the invention herein. Accordingly, it is intended that the invention be limited only by the spirit and scope of the appended claims.

What is claimed is:

1. A rotor structure for an interior permanent magnet electromotive machine, said rotor structure comprising:
   at least one rotor lamination comprising:
      at least one slot arranged to receive at least one permanent magnet, wherein said slot divides the rotor lamination into a pole region and a yoke region; and
      at least one bridge between the slot and an outer edge of the lamination, wherein the outer edge of the lamination is profiled along a segment of the bridge to define a concave curved profile for the bridge, wherein the concave curved profile for the bridge comprises a radius and allows to selectively size a thickness of the bridge to affect at least some electromagnetic and/or mechanical characteristic of the machine and wherein the radius of the concave curved profile of the bridge is least one half a length of the bridge.

2. The rotor structure of claim 1, wherein the concave curved profile of the bridge defines a notch.

3. The rotor structure of claim 1, wherein said at least one slot comprises at least a pair of slots extending from a respective center post arranged to further connect the pole region to the yoke region.

4. A rotor structure for an interior permanent magnet electromotive machine, said rotor structure comprising:
at least one rotor lamination comprising:
at least a pair of slots extending from a center post arranged to connect a pole region to a yoke region, said at least pair of slots arranged to receive at least one respective permanent magnet, wherein said at least pair of slots extends to a respective bridge between the slot and an outer edge of the lamination, wherein the outer edge of the lamination is profiled along a segment of the respective bridge to define a concave, curved profile for the respective bridge, wherein the concave curved profile for the bridge comprises a radius and allows sizing a respective thickness of the bridge and/or a respective thickness of the center post to affect at least some electromagnetic and/or mechanical characteristics of the machine and wherein the radius of the concave curved profile of the bridge is at least one half a length of the bridge.

5. The rotor structure of claim 4, wherein the concave curved profile of the bridge defines a notch.

6. An electromotive machine comprising:
a stator; and
a rotor operably coupled to the stator, the rotor having a plurality of stacked rotor laminations each comprising:
at least one slot arranged to receive at least one permanent magnet, wherein said slot divides the rotor lamination into a pole region and a yoke region; and
at least one bridge between the slot and an outer edge of the lamination, wherein the outer edge of the lamination is profiled along a segment of the bridge to define a concave curved profile for the bridge, wherein the concave curved profile for the bridge allows to selectively size a thickness of the bridge, wherein the concave curved profile of the bridge comprises a radius and further allows to selectively size a thickness of a center post arranged to further connect the pole region to the yoke region, wherein a combined sizing of the thickness of the bridge and the thickness of the center post is selected to balance at least some counter-opposing electromagnetic and/or mechanical characteristics of the machine and wherein the radius of the concave curved profile of the bridge is at least one half a length of the bridge.

7. The electromotive machine of claim 6, wherein the concave curved profile of the bridge defines a notch.

* * * * *

UNITED STATES PATENT AND TRADEMARK OFFICE
CERTIFICATE OF CORRECTION

| | | |
|---|---|---|
| PATENT NO. | : 8,541,919 B2 | Page 1 of 1 |
| APPLICATION NO. | : 12/713242 | |
| DATED | : September 24, 2013 | |
| INVENTOR(S) | : Lokhandwalla et al. | |

It is certified that error appears in the above-identified patent and that said Letters Patent is hereby corrected as shown below:

In the Specification

In Column 6, Line 33, delete "retrofitable" and insert -- retrofittable --, therefor.

In the Claims

In Column 7, Line 5, in Claim 1, delete "is least" and insert -- is at least --, therefor.

Signed and Sealed this
Fifteenth Day of April, 2014

Michelle K. Lee
*Deputy Director of the United States Patent and Trademark Office*